United States Patent [19]

Cilento

[11] 4,082,673
[45] Apr. 4, 1978

[54] FILTER ASEMBLY WITH INTEGRAL SERVICE SHUT-OFF VALVE

[75] Inventor: Guido D. Cilento, Dryden, N.Y.

[73] Assignee: AMF Incorporated, White Plains, N.Y.

[21] Appl. No.: 582,568

[22] Filed: May 30, 1975

Related U.S. Application Data

[63] Continuation-in-part of Ser. No. 477,720, Jun. 10, 1974, abandoned.

[51] Int. Cl.² ............................................. B01D 27/00
[52] U.S. Cl. .................................. 210/234; 210/429; 210/436; 210/444
[58] Field of Search ...................... 210/234, 429–436, 210/440, 444

[56] References Cited
U.S. PATENT DOCUMENTS

| 2,991,885 | 7/1961 | Gutkowski | 210/429 X |
| 3,826,466 | 7/1974 | Scaglione | 210/429 X |
| 3,935,106 | 1/1976 | Lipner | 210/444 |

FOREIGN PATENT DOCUMENTS

| 187,241 | 11/1923 | United Kingdom | 210/429 |

Primary Examiner—Frank A. Spear, Jr.
Assistant Examiner—Richard W. Burks
Attorney, Agent, or Firm—George W. Price; Charles J. Worth

[57] ABSTRACT

The filter assembly employs a closure portion having fluid inlet and outlet ports integral therewith enabling in-line use of the assembly. Associated with such closure is a spring biased valve handle, whereby rotation of the handle along a prescribed course of travel enables simultaneous closing of the inlet and outlet ports thusly permitting free movement of the filter assembly body from the closure. A vent is provided in the closure which acts to relieve internal pressure within the assembly thereby further enabling easy removal of the filter body.

9 Claims, 5 Drawing Figures

FILTER ASEMBLY WITH INTEGRAL SERVICE SHUT-OFF VALVE

This application is a C-I-P of my copending application, Ser. No. 477,720, filed June 10, 1974, and now abandoned, entitled, "Filter Assembly With Integral Service Shut-Off Valve".

The present invention is directed to a filter assembly and apparatus for use therewith. More particularly, the present invention is directed to a valve arrangement employed in such filter assembly.

From time to time, when cartridges employed to remove contaminents from fluid streams are spent, it obviously becomes necessary to replace such cartridges with fresh ones. However, failure or inadvertent actuation of the fluid stream valve while the cartridge assembly and/or associated connections are removed can create an undesirable condition.

To overcome this problem, the prior art has concerned itself with various arrangements for locking or latching the valves within the fluid stream to prevent accidental flow during the replacement of filter media. Such arrangements, however, have had a number of drawbacks and disadvantages including complexity of design, difficulty of use and limited functionality. To date, the art has failed to produce a simple and efficient automatic shut-off valve arrangement which also includes an automatic vent to release static pressure which is trapped in the sump.

It is the main object of the present invention to overcome the defects of the prior art.

It is the further object of the present invention to provide a valve arrangement provided with a handle adapted to be indexed with the head of the filter and caused to move into a predefined shut-off position.

A further object of the present invention is to provide a valve arrangement employing a push-in-rotatable handle for actuating a valve arrangement so as to latch the valve closed at a desired point in time.

Still another object of the present invention is to provide an automatic shut-off valve arrangement having vent means to release internal pressure built-up in the sump for easy removal of such sump.

The principal feature of the present invention is directed to a filter assembly for use in in-line fluid flow applications including: a filter body member having a closure portion associated therewith, fluid inlet means; fluid outlet means; each of said means being integral of said closure portion; handle means affixed to and communicating with said closure portion, said handle means being movable in concert with valve means disposed between said inlet and outlet means, said valve means being positioned in cooperative working relation with respect to said closure to thereby control the flow of fluid into said body member by rotation of said handle means; and vent means integrally formed of said closure portion for releasing internal pressure entrapped in said assembly.

Also within the scope of the invention is first and second positions for valve means placement with respect to said inlet and outlet means, said valve means being positionable by movement of said handle means for a prescribed amount of arcuate travel, spring means positioned at the lower portion of said handle means providing an upwardly biasing force to said handle with respect to said closure portion; slotted means depending from said handle for engagement with abutment means affixed to said closure portion.

The aforementioned objects and advantages of the present invention will be more fully understood with respect to the specification, claims and appended drawings.

In the drawings

Figure 1:
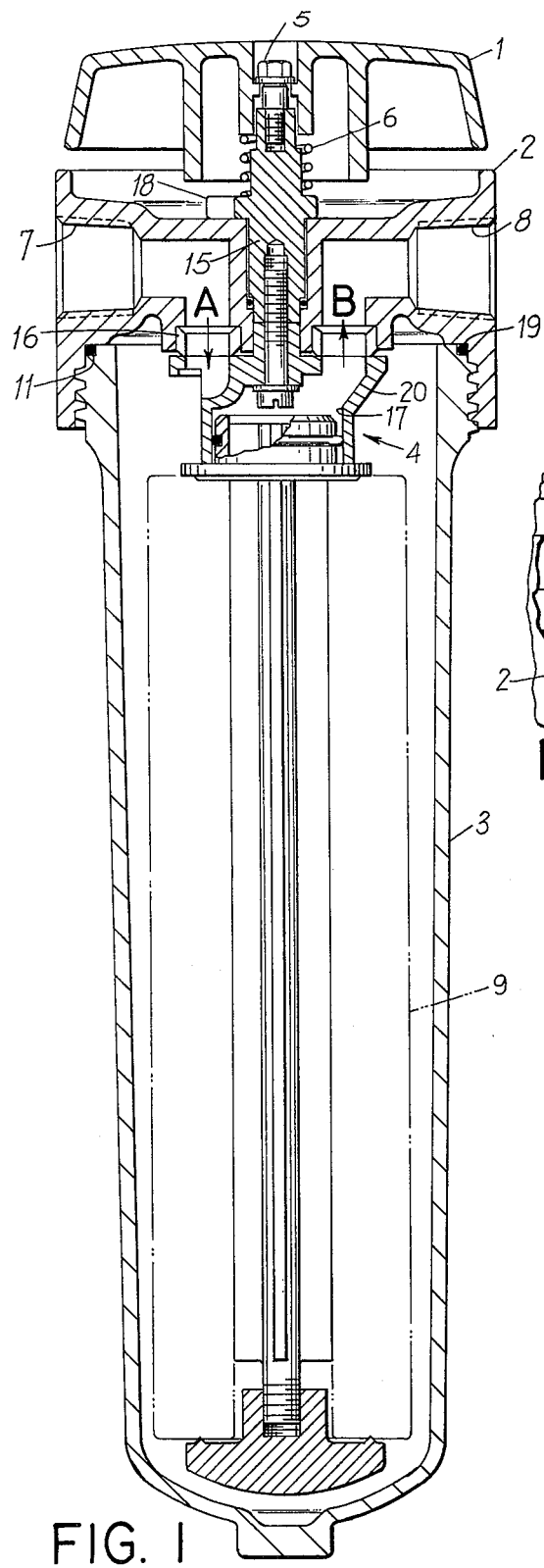
FIG. 1 is a partial cross sectional fragmented view of the present invention.
Figure 2:
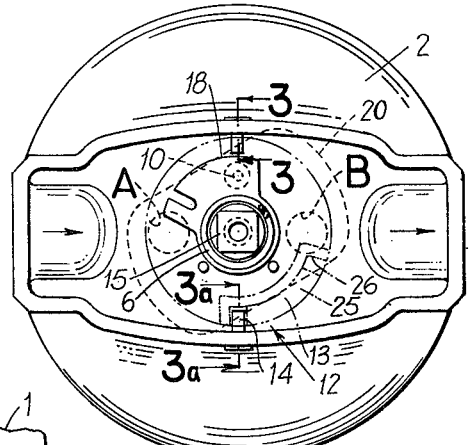
FIG. 2 is a top view, partially fragmented, of the closure, valve, and handle in the service position.
Figure 3A:
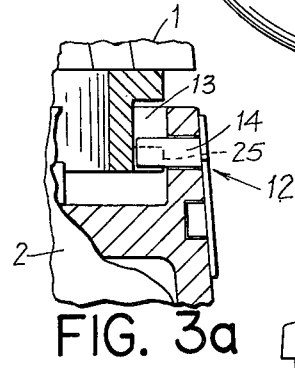
FIG. 3a is an enlarged fragmented view taken on line 3a—3a of FIG. 2.
Figure 3:
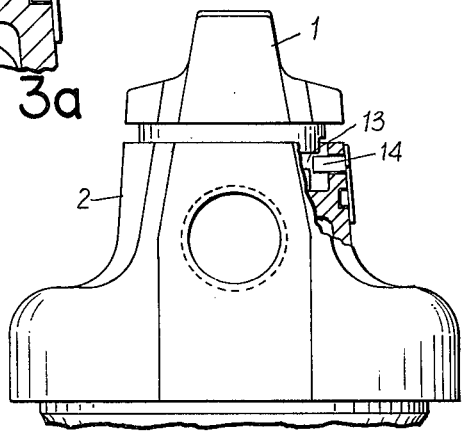
FIG. 3 is a partial end view with a portion thereof broken away along line 3—3 of FIG. 2 illustrating the valve latching arrangement of the invention.

In actual operation, as shown in FIGS. 1, 2 and 2a, a valve operating handle 1 is indexed with the cartridge filter head 2 that provides engagement and closure for the sump 3 and turns approximately 60° to a predesignated shut-off position and is released to snap back to a latched shut-off position as will be more clearly defined hereafter. The handle 1 moves up and down under the action of spring 6 on shaft 15. The shaft 15 and valve 20 are affixed to one another each across filter head 2 by a suitable fastening means, such that handle 1, shaft 15 and valve 20 rotate in fixed planes. In effect the handle 1 engages the valve 20 via shaft 15. Concurrently therewith, venting of static pressure is effectuated through internal porting so as to remove any entrapment from the sum 3. The valve 20 is provided with a two position arrangement, the first being a service position and the second being a shut-off position. In the service position, the handle 1 is disposed in the general direction of the piping and associated connections i.e. in line with fluid flow, as shown by arrows in FIGS. 1 and 2 and in its uppermost position, handle 1 is urged against a shoulder screw 5 by the spring 6. Valve flow passages A, B, are caused to be aligned with the flow ports 7, 8 in the filter head 2. Fluid entering the cartridge 9 is caused to flow to the outer surface of the cartridge and treated fluid is caused to be discharged through an outlet port (in the valve) B.

In the shut-off mode, the handle 1 is caused to be displaced approximately 60° from the service position by rotation and the internal ports 7, 8 in the filter head 2 are caused to be sealed such that fluid is neither admitted or discharged from the sump 3. As this occurs, an automatic vent 10 located on filter head 2 and in communication with the pressurized interior area of the entire assembly, is exposed to atmospheric pressure, thus purging the sump 3 of static pressure which became trapped as a result of the closure of the ports A, B. Such venting occurs by having lobe 18 integral of shaft 15 rotate in concert with movement of such shaft when the handle 1 is caused to rotate the full 60°. It follows that, once lobe 18 exposes vent 10 to atmospheric pressure, purging takes place. In the absence of internal pressure (after purging) the closure gasket 11 exerts a lower level of resistance to the torque required for removing the sump 3.

The handle 1 and a latch mechanism assembly 12 cooperate to permit the handle to rotate for only a prescribed arcuate distance when such handle is depressed and overcomes the upward resistance force caused by spring 6. For example, in proceeding from the closed to the open position, the handle 1 is caused to rotate for 60° and assumes a normally open position. The handle 1 is provided with a depending portion having a slot 13 for engagement with an internal projection 14 located on the inner periphery of a portion of filter head 2 which communicates with handle 1. The internal projection 14 is perpendicular to the direction of fluid flow. The slot 13 is so designed, that rotation of the handle is only accomplished when the handle 1 is initially depressed in a manner to overcome spring 6 opposing force.

When the filter is either in service or in the shut-off position, spring 6 urges handle 1 upwardly, causing projection 14 on filter head 2 to disengage the slot 13 on handle 1. This action prevents rotation of the handle 1, since projection 14 is opposed by the lower surface 25 of slot 13. When it is desired to rotate the handle 1 to either of the two aforementioned positions, engagement between the projection 14 and slot 13 results from depressing handle 1 sufficiently to cause projection 14 to engage slot 13 and handle 1 is rotated in the appropriate direction.

During operation of the filter assembly, the handle 1 is left in the service or in-line position and the valve 4 functions to interconnect the interior of the filter assembly with fluid flow. Once it becomes necessary to replace a spent cartridge, however, the handle 1 when depressed in opposition to a spring force created by spring 6, can rotate until it assumes a predefined position determined by projection 14 being restrained by surface 26 of slot 13 on handle 1. Once handle 1 has been restrained by surface 26, it springs up and is locked by the action of projection 14 on head 2 and surfaces 25 and 26 of slot 13 in handle 1, simultaneously causing venting through vent 10 as previously explained. Shaft 15 connecting the valve 20 and the handle 1 energizes the vent 1 when the valve 20 is in the closed position. Water ejected temporarily collects in the vicinity of vent hole 10. The sump 3 is removed by twisting or unscrewing and the water flows back into the sump 3 by the suction caused by turning and lowering of the sump 3. A slot (not shown) on shaft 15 is provided to ease the downflow of water. The assembly employs a sealing arrangement 16 that is specifically designed to permit positive sealing without the use of conventional lapped surfaces. This sealing allows the ports 7 and 8 to be isolated from the sump 3. The valve 20 is provided with ports A, B that are arranged diametrically opposite to one another such that, as in the case of cartridges where the direction or flow is from inside to outside, the valve 20 may be reversed without the need for reversing the installation or in some manner dismanteling the connections. Once the cartridge 9 has been removed, a fresh cartridge is installed through the valve center opening 17 and the sump 3 is firmly positioned. The handle 1 is depressed and placed by rotation into the service position. The closure gasket gland 11 serves to provide reliability and positive sealing of an "O" ring, as well as the release of the face gasket 19.

Figure 4:
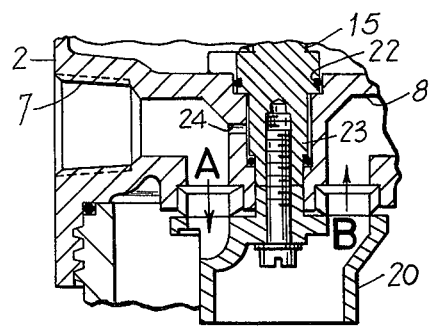
FIG. 4 is a fragmented sectional view of an alternate embodiment of the invention.

As shown in FIG. 4, the invention contemplates an arrangement which enables ease of rotation of the valve assembly at excessively high pressures. At times the fricitonal seal forces and the pressure end load tends to become so great as to make it difficult for the handle 1 to rotate. Obviously, with high operating pressures, i.e. 500 psi, frictional forces and rotational resistance to valve movement can become excessive. To overcome this problem and allow same to be functional without too much of a problem the invention contemplates employing a seal 22 and passage 24 to equalize the pressure across seals located at A and B which normally tends to oppose movement of the valve 20 from the OFF to the ON position. The forces internal of the valve assembly are a result of the internal pressure and is a function of the product of the pressure in seal areas A and B.

It follows that by employing countervaling pressures in the design criteria, it is possible to obtain smooth valve action through a balance of fluid pressures in the system. For example, it has been found that the pressure force at seals 22 equals the pressure force at seals 23 plus twice that at seals across A and B. In all cases, the area across seal 22 has to be designed to equal area at seals 23 + A + B.

The downward force resulting from the system pressure acting on A and B in addition to the downward pressure force of seal 23 are counterbalanced by an upward force resulting from internal pressure acting on seal 22. Opening 24 serves to admit system pressure to seals 22 and 23 respectively.

In conclusion, the concept of the present invention concerns itself with the operation of a valve assembly in conjunction with a filter unit for use in in-line fluid stream applications. The need to replace spent cartridges always exists, but to do so without loss of down time and in a relatively simple manner is what the present invention concerns itself with. By employing a handle depressed against the action of a spring, the valve assembly is urged to assume a shut-off position. Conversely, by releasing such handle, it obviously becomes possible to rotate the valve into the working position. The use of a push-in rotatable handle for actuating the valve coupled with a spring snap-out to latch or lock the valve closed, provides a most efficient arrangement for controlling the fluid flow during the changing of spent cartridges. As part of the overall concept, the invention contemplates an automatic venting arrangement which is actuated when the valve is in the shut-off position, so as to expel any static pressure in the sump prior to the removal of the cartridge.

It will be apparent to those skilled in the art from the preceeding description that certain changes may be made in the above apparatus without departing from the scope of the invention. It is intended that the descriptive matter above shall be interpreted as illustrative and in no way limiting, since all equivalents within the scope of the disclosure may be substituted and such substitution is intended.

What I claim is:

1. A filter assembly for use in in-line fluid flow applications including: a filter body having a closure portion associated therewith; fluid inlet means; fluid outlet means; each of said means being integral of said closure portion; handle means affixed to and communicating with said closure portion, said handle means being movable in concert with valve means disposed between said inlet and outlet means, said valve means being positioned in cooperative working relation with respect to said closure to thereby control the flow of fluid into said body member by rotation of said handle means; and vent means integrally formed of said closure portion for releasing internal pressure entrapped in said assembly.

2. A filter assembly as claimed in claim 1, including: valve means being alternately rotatable with respect to said closure for 60 arcuate degrees by movement of said handle means to thereby respectively open and close said chamber to fluid flow.

3. A filter assembly as claimed in claim 1, including: first and second positions for valve means placement with respect to said inlet and outlet means, said valve means being positionable by movement of said handle means for a prescribed amount of arcuate travel, spring means positioned at the lower portion of said handle means providing an upwardly biasing force to said handle with respect to said closure portion; slotted means depending from said handle for engagement with abutment means affixed to said closure portion.

4. A filter assembly as claimed in claim 3, including: valve engagement means formed in said closure permitting said valve means to be rotated in concert with said handle means by engagement of said slotted means with said abutment means, as said handle means is urged downwardly against said closure portion, shaft means connected to said handle at one end and having a shutter means at the opposite end thereof, said shutter means opening and closing said vent means in accordance with movement of said handle means.

5. A filter assembly as claimed in claim 3, wherein: said handle means being downwardly positionable against a bias means for subsequent rotation of said valve means into the closed position by the engagement of said handle means with said abutment.

6. A filter assembly as claimed in claim 3, wherein: rotation of said handle means from engagement between said abutment and said slotted means causes said handle means to float upwardly under the biasing action of said spring and thereby places said assembly into a fluid flow position.

7. A filter assembly as claimed in claim 1, including: vent means actuated responsive to the placement of said valve means into the off position to thereby purge said chamber interior of entrapped fluid.

8. A filter assembly as claimed in claim 1, including: handle means in a normally non-rotatable position caused to assume a working position by being urged downwardly against a spring, said handle being rotatable along a predefined path for a prescribed distance and moves upwardly to cause said fluid inlet and outlet ports to be closed off to fluid flow, and simultaneously therewith, said vent means being activated, allowing entrapped fluid to vent through exit means integral with said closure means.

9. A filter cartridge assembly as claimed in claim 4, including: internal fluid pressure balance means having a pressure equalization seal means disposed about a portion of said shaft means in cooperative working relationship with fluid passage means disposed below said pressure equalization seal for overcoming fluid pressures across sealing means between said shaft means, said closure portion and said fluid inlet and outlet means.

* * * * *